(12) United States Patent
Hawes et al.

(10) Patent No.: US 9,748,867 B2
(45) Date of Patent: Aug. 29, 2017

(54) CONTROL SYSTEM FOR LINEAR SWITCHED CAPACITIVE DEVICES

(71) Applicant: General Electric Company, Schenectady, NY (US)

(72) Inventors: Nathaniel Benedict Hawes, Milton, NY (US); Stefan Grubic, Albany, NY (US)

(73) Assignee: General Electric Company, Niskayuna, NY (US)

( * ) Notice: Subject to any disclaimer, the term of this patent is extended or adjusted under 35 U.S.C. 154(b) by 273 days.

(21) Appl. No.: 14/816,312

(22) Filed: Aug. 3, 2015

(65) Prior Publication Data

US 2017/0040910 A1 Feb. 9, 2017

(51) Int. Cl.
*H02N 1/00* (2006.01)

(52) U.S. Cl.
CPC .................................. *H02N 1/004* (2013.01)

(58) Field of Classification Search
CPC ....................................................... H02N 1/004
See application file for complete search history.

(56) References Cited

U.S. PATENT DOCUMENTS

| 4,127,804 | A |  | 11/1978 | Breaux |
| 4,546,292 | A |  | 10/1985 | Audren et al. |
| 4,595,852 | A |  | 6/1986 | Gundlach |
| 4,760,302 | A | * | 7/1988 | Jacobsen ................ H02N 1/004 |
| | | | | 310/12.28 |

(Continued)

FOREIGN PATENT DOCUMENTS

| CN | 103368452 A | 10/2013 |
| JP | H1187172 A | 3/1999 |

(Continued)

OTHER PUBLICATIONS

Matsuzaki et al., "Comparison of Electrostatic and Electromagnetic Motors Based on Fabrication and Performance Criteria",Micro Machine and Human Science, 1994. Proceedings., 1994 5th International Symposium, Issue Date: Oct. 2-4, 1994, Print ISBN: 0-7803-2095-6.

(Continued)

*Primary Examiner* — Robert W Horn
(74) *Attorney, Agent, or Firm* — Nitin N. Joshi

(57) ABSTRACT

A switched capacitive device includes a stationary portion including first circuit boards. The device also includes a translatable portion including second circuit boards proximate to, and interdigitated with, the first circuit boards. The second circuit boards are translatable with respect to the first circuit boards. The first circuit boards induce substantially linear motion of the second circuit boards through the use of an electric field induced by the first circuit boards. The device further includes a control system including switching devices and a controller coupled to the switching devices. The switching devices are coupled to at least a portion of at least one first circuit board. The switching device is configured to intermittently energize and de-energize the first circuit board for predetermined periods of time. The controller alternatingly opens and closes the switching devices through transmitted gating commands as a function of a determined load on the switched capacitive device.

23 Claims, 8 Drawing Sheets

(56) References Cited

U.S. PATENT DOCUMENTS

| | | | |
|---|---|---|---|
| 4,943,750 A | 7/1990 | Howe et al. | |
| 5,055,731 A * | 10/1991 | Nihei | H02N 1/004 310/12.02 |
| 5,262,695 A | 11/1993 | Kuwano et al. | |
| 5,378,954 A * | 1/1995 | Higuchi | B03C 7/026 310/12.04 |
| 5,448,124 A * | 9/1995 | Higuchi | H02N 1/004 310/12.04 |
| 5,541,465 A | 7/1996 | Higuchi et al. | |
| 5,708,319 A * | 1/1998 | Ban | H02N 1/004 310/12.14 |
| 5,801,472 A * | 9/1998 | Wada | G11B 9/14 310/309 |
| 5,928,791 A | 7/1999 | Rosenmayer | |
| 6,168,948 B1 | 1/2001 | Anderson et al. | |
| 6,184,607 B1 | 2/2001 | Cabuz et al. | |
| 6,353,276 B1 | 3/2002 | Gendron | |
| 6,359,757 B1 | 3/2002 | Mallary | |
| 6,373,682 B1 | 4/2002 | Goodwin-Johansson | |
| 6,771,002 B2 | 8/2004 | Jones | |
| 6,781,284 B1 | 8/2004 | Pelrine et al. | |
| 6,881,250 B2 | 4/2005 | Wong et al. | |
| 7,088,567 B2 | 8/2006 | Hunt et al. | |
| 7,091,648 B2 * | 8/2006 | Gondoh | H02N 1/004 310/309 |
| 7,115,161 B2 | 10/2006 | Magdassi et al. | |
| 7,230,364 B2 * | 6/2007 | Odaka | H02N 1/004 310/309 |
| 7,304,410 B2 * | 12/2007 | Odaka | H02N 1/004 310/309 |
| 7,372,186 B2 * | 5/2008 | Odaka | H02N 1/004 310/309 |
| 7,452,143 B2 | 11/2008 | Matsuki et al. | |
| 7,579,747 B2 * | 8/2009 | Takahashi | H02N 1/006 310/309 |
| 7,781,935 B2 | 8/2010 | Jager et al. | |
| 7,877,231 B2 | 1/2011 | Bharadwaj et al. | |
| 8,013,667 B2 | 9/2011 | Ikehashi | |
| 8,278,797 B2 | 10/2012 | Sashida | |
| 8,483,017 B2 | 7/2013 | Bisig | |
| 8,580,384 B2 | 11/2013 | Zheng et al. | |
| 8,618,715 B2 | 12/2013 | Shimanouchi et al. | |
| 8,710,793 B2 | 4/2014 | Despesse | |
| 8,716,916 B2 * | 5/2014 | Nakatsuka | H02N 1/004 310/308 |
| 9,231,495 B2 * | 1/2016 | Takahashi | H02N 1/004 |
| 9,595,892 B2 * | 3/2017 | Takahashi | H02N 1/004 |
| 2005/0062138 A1 * | 3/2005 | Williams | B81B 3/0018 257/664 |
| 2009/0001846 A1 * | 1/2009 | Bedillion | H02N 1/004 310/309 |
| 2009/0201623 A1 | 8/2009 | Steeneken | |
| 2010/0085843 A1 | 4/2010 | Bisig | |
| 2012/0055768 A1 | 3/2012 | Reimann et al. | |
| 2013/0106317 A1 | 5/2013 | Ludois | |
| 2013/0300252 A1 | 11/2013 | Johnson | |
| 2014/0175941 A1 | 6/2014 | Johnson | |
| 2017/0040910 A1 * | 2/2017 | Hawes | H02N 1/004 |

FOREIGN PATENT DOCUMENTS

| | | |
|---|---|---|
| JP | 2012023839 A | 2/2012 |
| WO | 2013168191 A1 | 11/2013 |

OTHER PUBLICATIONS

Niino, T. et al., "Electrostatic Artificial Muscle: Compact, High-Power Linear Actuators with Multiple-Layer Structures," Proceedings IEEE Micro Electro Mechanical Systems An Investigation of Micro Structures, Sensors, Actuators, Machines and Robotic Systems, Jan. 25-28, 1994, pp. 130-135; Print ISBN:0-7803-1833-1.

Cooney, Michael, "DARPA program targets 20-fold increase in robot range, endurance," NetworkWorld.com Community, created Jul. 5, 2012, retrieved from website www.networkworld.com/cornmunity/print/80972.

Buehler, Martin. Dynamic locomotion with one, four and six-legged robots. McGill Univ Montreal (Quebec), 2005.

Philp, Sanborn F. "The vacuum-insulated, varying-capacitance machine." Electrical Insulation, IEEE Transactions on 2 (1977): 130-136.

O'Donnell, R. J., et al. "The variable-capacitance machine for off-shore wind generation." (2006): 131-135.

Singh, S. P., Bhim Singh, and M. P. Jain. "Performance characteristics and optimum utilization of a cage machine as capacitance excited induction generator." Energy Conversion, IEEE Transactions on 5.4 (1990): 679-685.

Bakri-Kassem et al., "A parallel-plate MEMS variable capacitor with vertical thin-film comb actuators", Microwave Conference, 2007. European, IEEE Xplore, pp. 1349-1352, Conference Location: Munich, Oct. 9-12, 2007.

Niino T et al., "Dual excitation multiphase electrostatic drive", Industry Applications Conference, 1995. Thirtieth IAS Annual Meeting, IAS '95., Conference Record of the 1995 IEEE, IEEE Xplore, pp. 1318-1325, vol. 2, Conference Location: Orlando, FL, Oct. 8-12, 1995.

"High Power Electrostatic Motor", Shinsei Corporation, downloaded from "http://www.shinsei-motor.com/English" on Jan. 7, 2014 (7 pgs).

Akio Yamamoto et al., "Modeling and identification of an electrostatic motor", Precision Engineering, pp. 104-113, vol. 30, Issue: 1, Jan. 2006.

Chaput, Simon, et al. "A 3.7 V to 200 V highly integrated DC-DC converter with 70.4% efficiency for portable electrostatic MEMS applications." New Circuits and Systems Conference (NEWCAS), 2014 IEEE 12th International. IEEE, 2014.

* cited by examiner

CONTROL SYSTEM FOR LINEAR SWITCHED CAPACITIVE DEVICES

STATEMENT REGARDING FEDERALLY SPONSORED RESEARCH & DEVELOPMENT

This invention was made with Government support under contract number W31P4Q-13-C-0095 awarded by the Defense Advanced Research Projects Agency (DARPA). The Government has certain rights in this invention.

BACKGROUND

The field of the disclosure relates generally to actuators and motors and, more particularly, to power control systems for linear switched capacitance actuators and motors.

Many known motors/actuator devices use magnetic fields as a force transfer mechanism rather than electric fields due to the higher energy densities achieved with magnetic fields using conventional materials and configurations. Such known devices are sometimes referred to as electromechanical actuators (EMAs). At least some of these EMAs include at least one electric motor as a driving device, such motor coupled to one of an alternating current (AC) power source and/or a direct current (DC) power source. Some of these known motor-driven EMAs may also include a power transfer device, e.g., a geared transmission or a direct drive shaft. However, such known EMAs have some disadvantages for smaller applications, such as operation of robot translatables and aviation devices.

At least some other known motors and actuators use electric fields rather than magnetic fields for electro-mechanical energy transfer. A switched capacitance actuator (SCA) is an electric field-based device that demonstrates an improved energy density over earlier electric field-based devices. The electro-mechanical energy conversion is at least partially a result of the change in the device capacitance with respect to rotor translation. Such SCAs are electrostatic motors that include a translatable portion, e.g., a rotor and a stationary portion, e.g., a stator and operate in a manner similar to the magnetic field equivalent of the SCA, i.e., a switched reluctance motor (SRM).

However, such known SCAs do not match electromagnetic machines with respect to the motion inducing shear stress, i.e., total force or torque output per unit rotor surface area. Typically, magnetically coupled actuators have gravimetric power densities below 1 kiloWatt per kilogram (kW/kg). In comparison, typical hydraulic actuators have gravimetric power densities on the order of 3-5 kW/kg, however, such typical hydraulic actuators have low efficiencies. Therefore, to attempt to achieve parity with electromagnetic devices with respect to power-to-weight ratio, at least some known SCAs compensate for the relatively lower shear stress by increasing the active area of the air gap defined by the SCA rotor and stator. According to Gauss' theorem, electric field lines are not required to define closed field loops, and in contrast, magnetic field lines form closed loops that originate and terminate on the magnet. Since the electric field lines do not need to be closed, the rotor surface area may be increased by adding active layers.

In order to maintain constant force, magnetically coupled devices, such as EMAs, maintain constant current, whereas electrostatic devices, such as known SCAs maintain constant voltage. As such, SCAs usually require a high voltage and a low current for operation, whereas EMAs are operated at comparatively higher current and lower voltages. Due to a lower shear stress, SCAs tend to require more surface area than EMAs. This requirement, coupled with the fact that electric field lines terminate on charges, leads to a machine structure for many known SCAs which resembles a stack of interleaved stationary and translatable plates, i.e., circuit boards including a plurality of unit cells.

Such known SCAs have limited power regulation features. For example, such known SCAs have limited regulatory control of the total actuator force or torque induced. One simple implementation of power regulation is to apply the same voltage to the entire actuator, i.e., each board and unit cell are exposed to the same poly-phase excitation. However, if the commanded force/torque is low compared to the rated machine force/torque, poor dynamic performance may result, discretization electrical chatter may become prominent, or the SCA may operate in a low efficiency manner. In addition to low force induction and noisy and inefficient operation, the electrical structure used to induce a singular voltage to all circuit boards reduces the fault tolerance of the SCA.

BRIEF DESCRIPTION

In one aspect, a switched capacitive device is provided. The switched capacitive device includes a stationary portion comprising a plurality of first circuit boards extending at least partially in a predetermined dimension. The switched capacitive device also includes a translatable portion including a plurality of second circuit boards proximate to, and interdigitated with, the plurality of first circuit boards. The plurality of second circuit boards is translatable with respect to the plurality of first circuit boards. The plurality of second circuit boards extends at least partially in the predetermined dimension. The plurality of first circuit boards is configured to induce substantially linear motion of the plurality of second circuit boards in the predetermined dimension through the use of an electric field induced by at least a portion of the plurality of first circuit boards. The switched capacitive device also includes a control system including a plurality of switching devices. At least one switching device of the plurality of switching devices is coupled to at least a portion of at least one first circuit board of the plurality of first circuit boards. The at least one switching device is configured to intermittently energize and de-energize the at least a portion of the at least one first circuit board for predetermined periods of time. The control system also includes a controller coupled to the plurality of switching devices. The controller is configured to alternatingly open and close the plurality of switching devices through transmitted gating commands as a function of a determined load on the switched capacitive device.

In a further aspect, a machine is provided. The machine includes a body and at least one mechanism translatably coupled to the body and including at least one switched capacitive device configured to induce movement of the at least one mechanism. The at least one switched capacitive device includes a stationary portion comprising a plurality of first circuit boards extending at least partially in a predetermined dimension. The switched capacitive device also includes a translatable portion including a plurality of second circuit boards proximate to, and interdigitated with, the plurality of first circuit boards. The plurality of second circuit boards is translatable with respect to the plurality of first circuit boards. The plurality of second circuit boards extends at least partially in the predetermined dimension. The plurality of first circuit boards is configured to induce substantially linear motion of the plurality of second circuit boards in the predetermined dimension through the use of an electric field induced by at least a portion of the plurality of first circuit boards. The switched capacitive device also includes a control system including a plurality of switching devices. At least one switching device of the plurality of switching devices is coupled to at least a portion of at least one first circuit board of the plurality of first circuit boards. The at least one switching device is configured to intermittently energize and de-energize the at least a portion of the at least one first circuit board for predetermined periods of time. The control system also includes a controller coupled to the plurality of switching devices. The controller is configured to alternatingly open and close the plurality of switching devices through transmitted gating commands as a function of a determined load on the switched capacitive device.

In another aspect, a method for converting electrical energy into mechanical energy through a switched capacitive device is provided. The switched capacitive device includes a stationary portion and a translatable portion. The stationary portion includes a plurality of first circuit boards extending at least partially in a predetermined dimension. The translatable portion includes a plurality of second circuit boards proximate to, and interdigitated with, the plurality of first circuit boards. The plurality of second circuit boards is translatable with respect to the plurality of first circuit boards. The switched capacitive device further includes a control system including a plurality of switching devices. At least one switching device of the plurality of switching devices is coupled to at least a portion of at least one first circuit board of the plurality of first circuit boards. The at least one switching device is configured to intermittently energize and de-energize the at least a portion of the at least one first circuit board for predetermined period of times. The control system includes a controller coupled to the plurality of switching devices. The controller is configured to alternatingly open and close the plurality of switching devices through transmitted gating commands as a function of loads of the switched capacitive device. The method includes determining a portion of the second circuit boards to be used to induce a predetermined force for a predetermined period of time for positioning the translatable portion. The method also includes determining a first portion of the first circuit boards to be energized and a second portion of the first circuit boards to be de-energized. The method further includes transmitting a plurality of gating commands from the controller to the plurality of switching devices. The method also includes opening a first portion of the plurality of switching devices and closing a second portion of the plurality of switching devices. The method further includes inducing the predetermined electric field. The electric field is further induced about the portion of the plurality of second circuit boards. The method also includes inducing substantially linear motion of the translatable portion.

DRAWINGS

These and other features, aspects, and advantages of the present disclosure will become better understood when the following detailed description is read with reference to the accompanying drawings in which like characters represent like parts throughout the drawings, wherein.

Figure 1:
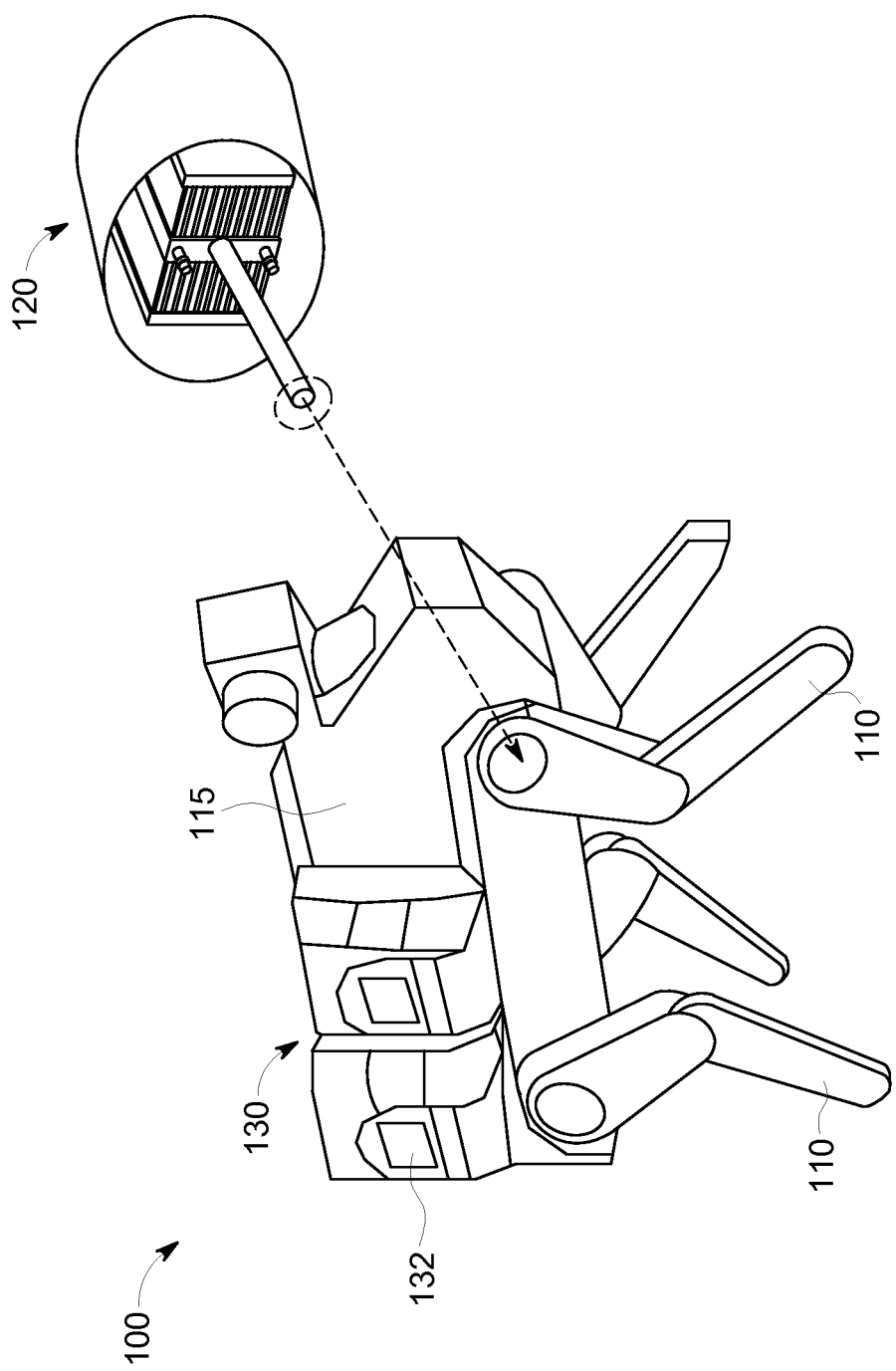
FIG. 1 is a schematic view of an exemplary robotic device that includes exemplary robotic translatables that each include an exemplary switched capacitive actuator (SCA)

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processing device, cause the processing device to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The switched capacitive devices described herein provide a cost-effective method for increasing the energy efficiency of the associated devices and systems. Specifically, in order to achieve higher total energy efficiency for the actuation systems embedded within those systems, a high power switched capacitance actuator (SCA) is used. More specifically, operation of the disclosed SCAs is based on a spatial change of electric fields rather than based on magnetic fields which are used in some conventional EMAs. The SCAs described herein offer advantages over electromagnetic machines that include, without limitation, sufficient torque generation without using continuous current, removing the requirement of using an iron core as a magnetic conductor, eliminating the need for a yoke, and significantly decreasing the amount of copper in the actuators, thereby decreasing the size, weight, and costs of the actuators. Also, specifically, the SCAs described herein are linear, direct drive SCAs without a transmission gear. Therefore, the embodiments described herein further facilitate decreasing the weight of actuation systems used in mobile and/or translatable machines.

In addition, the SCAs described herein provide for an improved efficiency over that of electromagnetic machines because the "stack of plates" structure used with the SCAs as described herein facilitate direct integration of power electronics devices. Specifically, power switches directly installed on individual SCA plates facilitate dynamic engagement and disengagement of specific portions of the associate SCA. As such, "variable recruitment" features are used to dynamically regulate the power and torque generated by the associated SCA. As used herein, the term "variable recruitment" is used to define the features associated with selectively opening and closing power switches to selectively de-energize and energize specific circuit boards and specific portions of circuit boards to generate the power and torque necessary to execute specific movements under specific loading conditions. As such, selectively and dynamically disabling and enabling portions of the SCA facilitates increasing the efficiency of operation of the SCA, resulting in lower power consumption and extended life of a present charge on a portable power supply. The ability to enable and disable selected circuit boards at the board level is referred to as "board level" control. Similarly, individual sections of the circuit boards may be selectively enabled or disabled and this ability is referred to as "intra-board level" controls. In addition to increased energy efficiency and reduced power consumption, a fault-tolerance of the SCAs described herein is enhanced. Specifically, in the event of a specific board failure, e.g., a short circuit or an open circuit condition, the power electronics are used to isolate and disable the damaged circuit board. For those SCAs with a large number of circuit boards, e.g., 100 or more, the SCA inherently is configured to tolerate a large range of "degraded" operating conditions.

FIG. 1 is a schematic view of an exemplary machine, and more specifically, a robotic device, i.e., a legged robot 100 that includes exemplary translatable mechanisms, i.e., robotic translatables 110 in the form of translatable legs coupled to a robot body 115. In the exemplary embodiment, four translatables 110 are shown. Alternatively, robotic device 100 includes any number of translatables 110 that enables operation of robotic device 100 as described herein. Each of robotic translatables 110 includes a switched capacitive device, i.e., a switched capacitance actuator (SCA) 120. Legged robot 100 also includes an independent electric power supply system 130 coupled to robot body 115. In the exemplary embodiment, system 130 is a plurality of direct current (DC) batteries 132. Batteries 132 are coupled to SCA 120 through a converter (not shown) that includes, e.g., and without limitation, a direct current-to-alternating current (DC/AC) inverter coupled to a high frequency DC/DC step up converter through a high voltage DC link. Such converters have ratings that include, without limitation, a range of power outputs between 0.1 kilowatt (kW) and 100.0 kW, a range of voltage outputs between 500 volts (rms) and 3000 volts (rms), a range of DC link voltages between 0.8 kilovolts (kV) and 5.0 kV, and an output frequency in a range between 0 Hertz (Hz) and 1000 Hz.

Alternative embodiments of robotic devices include, without limitation, assembly line robots. Such assembly line robots typically include a single robotic arm that includes a device, such as SCA 120 receiving AC power from an alternating current (AC) source through a power converter system that includes an AC/DC boost rectifier coupled to the AC power source, a DC/AC inverter coupled to SCA 120, and a high voltage DC link coupled to the rectifier and the inverter. Such converters have ratings that include, without limitation, a range of power outputs between 0.1 kW and 100.0 kW, a range of voltage outputs between 500 volts (rms) and 3000 volts (rms), a range of DC link voltages between 0.8 kV and 5.0 kV, and an output frequency in a range between 0 Hz and 1000 Hz.

Figure 2:
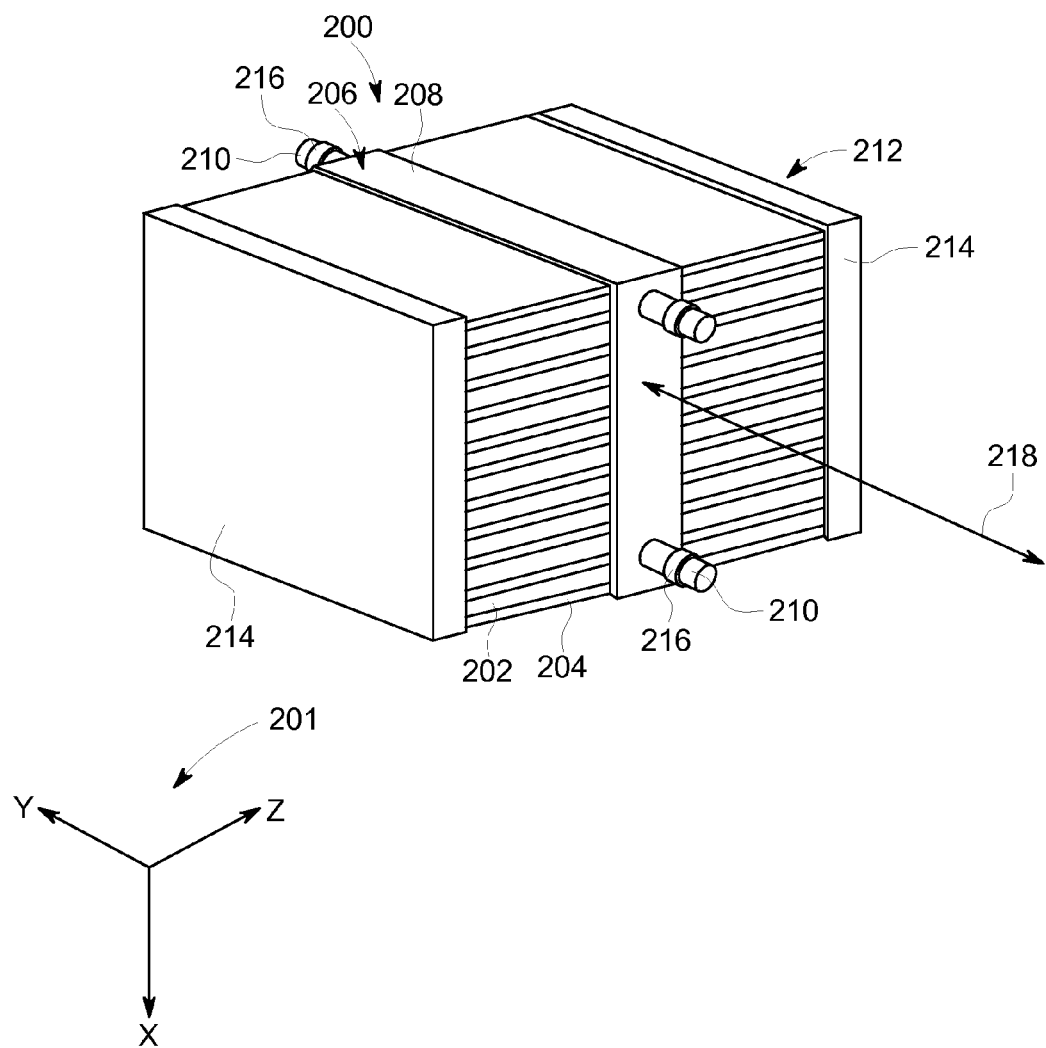
FIG. 2 is a schematic perspective view of an exemplary linear SCA that may be used with the robotic device shown in FIG. 1.

FIG. 2 is a schematic perspective view of an exemplary linear SCA 200 that may be used with robotic device 100 as an exemplary embodiment of SCA 120 (both shown in FIG. 1). A coordinate system 201 includes an x-axis (height dimension/direction), a y-axis (longitudinal dimension/direction), and a z-axis (width, or transverse dimension/direction) for reference, where each of the three axes are orthogonal to the other two axes. For purposes of clarity and consistency herein, the terms "height dimension", "longitudinal dimension", and "transverse dimension", respectively are used. In the exemplary embodiment, linear SCA 200 includes a translatable assembly 206 that includes a translatable center piece 208 and twenty (20) translatable circuit boards 202. Translatable center piece 208 includes four shafts 210 (only three shown). Translatable circuit boards 202 are manufactured with a precise predetermined thickness and dovetailed into center piece 208 with precise slots (not shown) defined therein. Linear SCA 200 also includes a stationary assembly 212 that includes two side plates 214, twenty-two (22) stator circuit boards 204, and four bearings 216 (only three shown). Stationary circuit boards 204 are manufactured with a precise predetermined thickness and dovetailed into side plates 214 with precise slots (not shown) defined therein. Stationary circuit boards 204 and translatable circuit boards 202 are substantially parallel to, and interdigitated with, each other. Translatable assembly 206 is substantially linearly translatable with respect to stationary assembly 212 with movement of translatable assembly 206 induced in opposing directions parallel to a predetermined direction, i.e., in the exemplary embodiment, without limitation, and consistently hereon, the longitudinal y-axis as indicated by direction of translation arrow 218. Alternatively, since identification of the three orthogonal dimensional/directional axes may be arbitrary, translation of translatable assembly 206 in any direction or dimension that enables operation of SCA 200 as described herein is used.

Translatable center piece 208 and side plates 214 are fabricated from electrically insulated structural materials to hold circuit boards 204 and 202, respectively, such that a gap (not shown in FIG. 2) of predetermined dimensions is defined. Such electrically insulated structural materials include any combination of, without limitation, thermosets and thermoplastics. Thermosets include epoxies either unfilled or filled with fillers and fiberglass to improve mechanical and electrical properties. Thermoplastics include selections from a plurality of engineering plastics, e.g., without limitation, polypropylene, polyetherimide, and polycarbonates that may be either filled or unfilled with fillers and fiberglass to improve mechanical and electrical properties.

Linear SCA 200 is configured to induce a shear force in the longitudinal direction in a range between approximately 260 Newtons (N) and approximately 1200 N with a continuous power draw at a translation rate of translatable assembly 206 of approximately 1.25 meters per second (m/s) in a range between approximately 375 Watts (W) and approximately 2500 W. The weight of linear SCA 200 is in a range between approximately 800 grams (g) and approximately 1220 g to provide a gravimetric power density in a range between approximately 375 Watts per kilogram (W/kg) and approximately 2500 W/kg and a gravimetric force density in a range between approximately 300 Newtons per kilogram (N/kg) and approximately 2000 N/kg.

Figure 3:
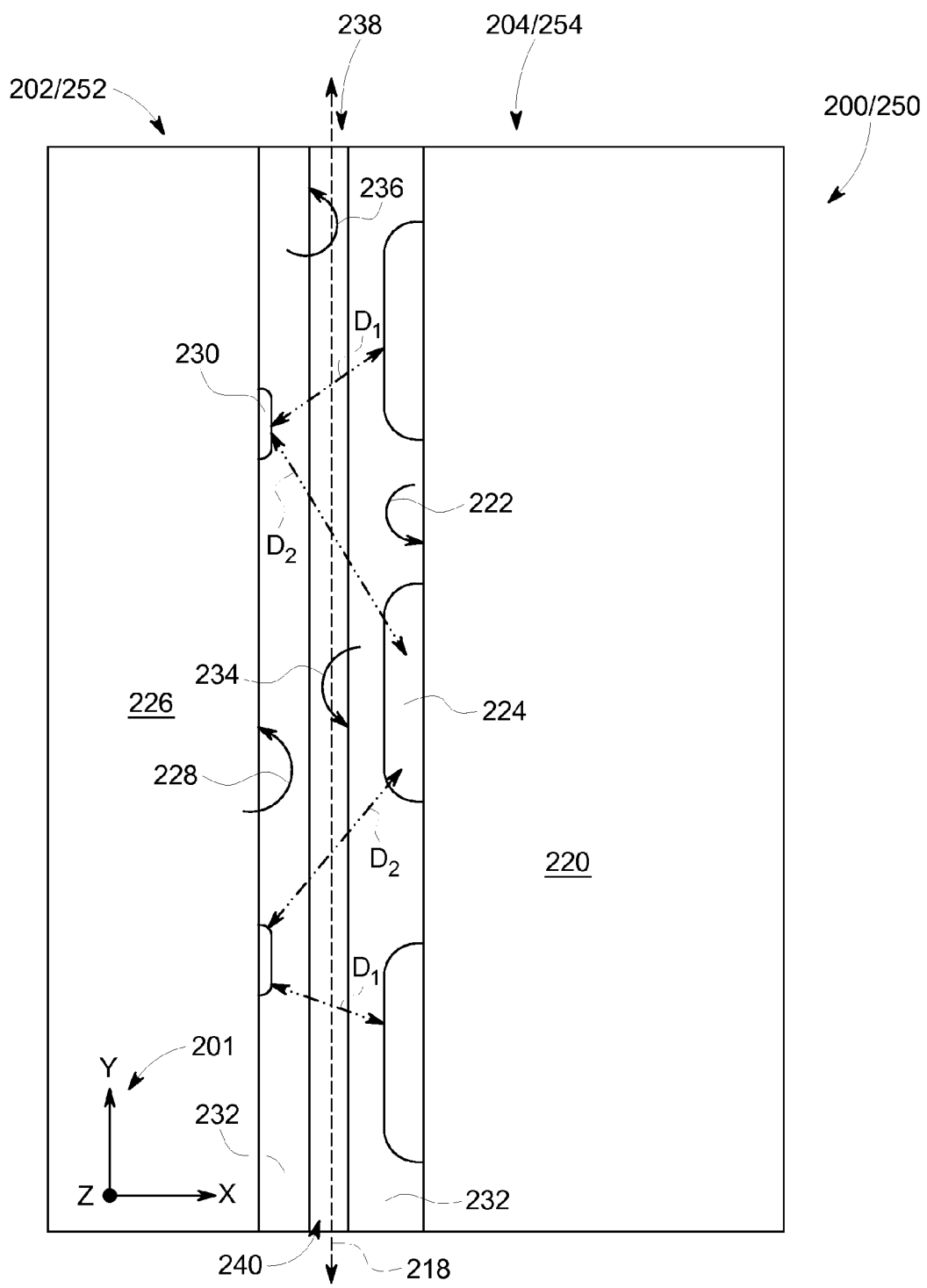
FIG. 3 is a schematic view of a portion of the SCA shown in FIG. 2.

FIG. 3 is a schematic view of a portion of SCA 200 between a translatable circuit board 202 and a stationary circuit board 204. Coordinate system 201, including the x-axis (height dimension), the y-axis (longitudinal dimension), and the z-axis (transverse dimension), is provided for reference. In the exemplary embodiment, stationary circuit board 204 includes a stationary substrate 220 having a stationary substrate surface 222 and a plurality of stationary electrodes 224 positioned thereon. Similarly, translatable circuit board 202 includes a translatable substrate 226 having a translatable substrate surface 228 and a plurality of translatable electrodes 230 positioned thereon. Cross-sections of stationary electrodes 224 and translatable electrodes 230 are shown in FIG. 3 and electrodes 224 and 230 extend in the transverse, i.e., z-direction orthogonal to the longitudinal, i.e., y-direction.

Stationary electrodes 224 and translatable electrodes 230 are coupled to stationary substrate surface 222 and translatable substrate surface 228, respectively, through any method that enables operation of linear SCA 200 as described herein, including, without limitation, adhesives, soldering, direct bonding, and brazing, where the adhesive, soldering, direct bonding, and brazing materials (not shown) are structurally, chemically, and electrically compatible with stationary electrodes 224 and stationary substrate 220 and translatable electrodes 230 and translatable substrate 226, respectively. In the exemplary embodiment, stationary substrate 220 and translatable substrate 226 are manufactured from any material that enables operation of linear SCA 200 as described herein, including, without limitation, an epoxy composite with a predetermined permittivity, such as, without limitation, FR-4, alumina ceramics, and flexible circuit board films to facilitate structural support of stationary electrodes 224 and translatable electrodes 230. Further, stationary electrodes 224 and translatable electrodes 230 are formed from any materials that enable operation of linear SCA 200 as described herein.

Also, in the exemplary embodiment, at least one layer of dielectric coatings 232 is formed on each of stationary substrate surface 222 and translatable substrate surface 228. Alternatively, in some embodiments, SCA 200 includes at least one layer of dielectric coatings 232 on only one of stationary substrate surface 222 and translatable substrate surface 228. Dielectric coatings 232 are formed from high permittivity materials, including, without limitation, semicrystalline terpolymer P(VDF-TrFE-CFE), where VDF is vinylidene fluoride, TrFe is trifluoroethylene, and CFE is 1,1-chlorofluoroethylene, and barium titanate ($BaTiO_3$) doped polymers. Dielectric coating 232 formed on stationary substrate surface 222, in some embodiments, is a different material from coating 232 formed on translatable substrate surface 228. Moreover, in some embodiments, dielectric coatings 232 are formed from a plurality of layers, where one or more layers are the same material or one of more layers are a different material. Further, stationary electrodes 224 and translatable electrodes 230 are fully embedded within dielectric coatings 318. Alternatively, stationary electrodes 224 and translatable electrodes 230 are partially embedded within dielectric coatings 232 such that a portion of stationary electrodes 224 and translatable electrodes 230 are exposed. Dielectric coatings 232 facilitate improving performance of SCA 200 by increasing corona and surface flashover voltage, increasing the electrical polarization and hence the power density, and reducing a potential for any ferroelectric hysteresis loss through the proper choice of dielectric material.

Moreover, in the exemplary embodiment, a stationary dielectric coating surface 234 and a translatable dielectric coating surface 236 define a gap 238 filled with a dielectric fluid 240 (discussed further below).

In operation, stationary electrodes 224 and translatable electrodes 230 correspond to the magnetic poles of a switched reluctance motor (SRM). In general, SCAs are electrostatic motors that include a translatable portion, e.g., a rotor and a stationary portion, e.g., a stator, and operate in a manner similar to the magnetic field equivalent of the SCA, i.e., a SRM. For example, both the rotor and stator include multiple electrodes that correspond to magnetic poles in a SRM. When voltage is applied to a stator capacitor electrode pair, a rotor electrode will induce rotation in the rotor to align with the stator capacitor electrode pair. When the voltage on this stator electrode pair is removed, the appropriate next stator electrode pair that is not aligned with the rotor electrode is energized with a voltage to continue the rotational motion. Thus an external switching circuit is required to switch the stator excitation, though the machine may be configured to operate synchronously with three-phase sinusoidal excitation.

As such, in the exemplary embodiment, when an adjacent pair of stationary electrodes 224 is energized with a voltage, an electric field (not shown) is induced within gap 238. The electric field includes a plurality of low density distribution regions (not shown) proximate those regions in gap 238 between adjacent stationary electrodes 224 and adjacent translatable electrodes 230 substantially parallel to direction of translation 218. The electric field also includes a plurality of intermediate density distribution regions (not shown) proximate those regions in gap 238 having nonaligned stationary electrodes 224 and translatable electrodes 230. The electric field further includes a plurality of high density distribution regions (not shown) proximate those regions in gap 238 having aligned stationary electrodes 224 and translatable electrodes 230. The strength of the electrical coupling, i.e., the density of the field distribution is proportional to the distance between stationary electrodes 224 and translatable electrodes 230. Therefore, the high density distribution regions and intermediate density distribution regions are proportional to distance $D_1$ and distance $D_2$, respectively. The high density distribution regions induce electric field distribution values within a range between approximately 10 kilovolts (kV) per millimeter (mm) and approximately 30 kV/mm.

Moreover, when an adjacent pair of stationary electrodes 224 is energized with a voltage, a proximate translatable electrode 230 substantially linearly translates to align with stationary electrodes 224. Once the adjacent pair of stationary electrodes 224 and proximate translatable electrodes 230 are aligned, the voltage on this pair of stationary electrodes 224 is removed and the appropriate next pair of stationary electrodes 224 that is not aligned with proximate translatable electrodes 230 is energized with the DC voltage to continue the substantially linear motion as shown by arrow 218. In the exemplary embodiment, stationary electrodes 224 are energized to a value of approximately +3000 volts and translatable electrodes 230, which are grounded, have a voltage of approximately zero volts. Alternatively, any voltages are used that enable operation of SCA 200 as described herein.

To increase and more evenly distribute the force exerted on translatable circuit board 202, multiple stationary electrodes 224 may be energized substantially simultaneously, e.g., without limitation, every other stationary electrode 224. To facilitate such simultaneous energization, an external switching circuit (not shown) may be used to switch the excitation of stationary electrodes 224. Also, SCA 200 may also be energized through a synchronous three-phase power alternating current (AC) system.

As described above, FIG. 3 is a schematic view of a portion of SCA 200. In some alternative embodiments, SCA 200 as shown in FIG. 3 is complete. In the exemplary embodiment, SCA 200 is sectionalized into a plurality of unit cells 250 coupled together. Specifically, in the exemplary embodiment, FIG. 3 is a schematic side view of an exemplary unit cell 250 that may be used with SCA 200. Unit cell 250 is the smallest repeating portion of SCA 200 and unit cell 250 includes the general configuration as shown in FIG. 3. Each unit cell 250 includes a translatable section 252 of translatable circuit board 202 and a stationary section 254 of stationary circuit board 204. Translatable section 252 and stationary section 254 are complementary with each other along their respective surfaces 228 and 222, and in opposition to each other across gap 238.

SCA 200 includes a plurality of unit cells 250 coupled together to form continuous stationary circuit board 204 and continuous translatable circuit board 202. Also, unit cell 250 includes a first number representative of the number stationary electrodes 224 and a second number representative of the number of translatable electrodes 230, where the first number is greater than the second number. In the exemplary embodiment, unit cell 250 includes three stationary electrodes 224 and two translatable electrodes 230. Alternatively, unit cell 250 includes any number of stationary electrodes 224 and any number of translatable electrodes 230, including, without limitation, the same number of translatable electrodes 230 as stationary electrodes 224 and a greater number of translatable electrodes 230 as stationary electrodes 224.

Figure 4:
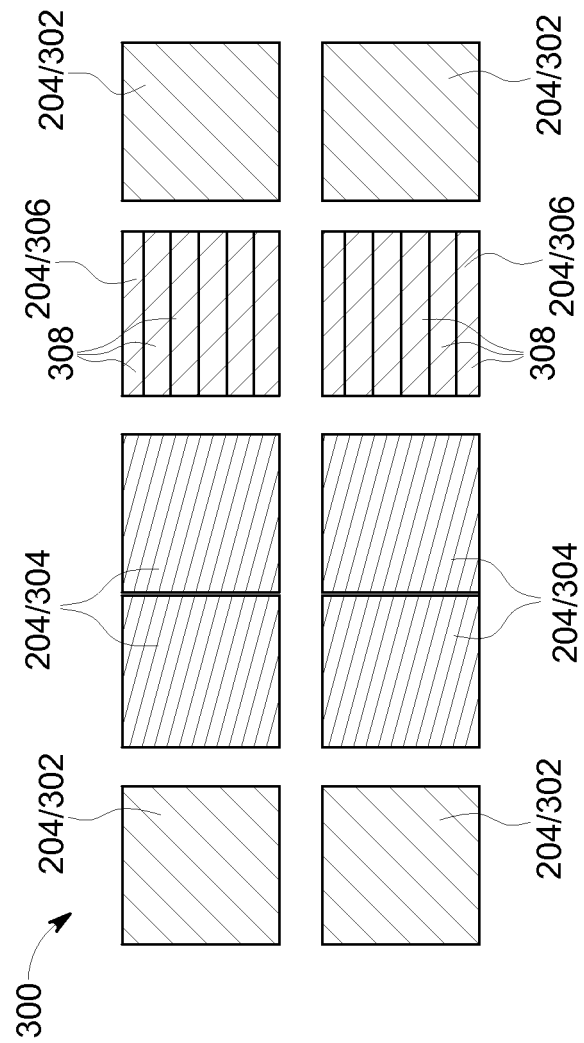
FIG. 4 is a schematic conceptual view of an exemplary logarithmic actuator configuration that may be used with the SCA shown in FIGS. 1, 2, and 3.

FIG. 4 is a schematic conceptual view of an exemplary logarithmic actuator configuration 300 that may be used with SCA 200 (shown in FIGS. 1, 2, and 3). Translatable circuit boards 202 (shown in FIG. 3) are not shown for clarity. In the exemplary embodiment, actuator configuration 300 includes 10 stationary circuit boards 204. Specifically, actuator configuration 300 includes a plurality of stationary circuit boards 204 with varying configurations. There are four first stationary circuit boards 302 that are non-sectionalized and include single board level control (described further below). Also, there are four second stationary circuit boards 304 that are non-sectionalized and controlled in pairs. Further, there are two third stationary circuit boards 306 that include a plurality of sectionalized unit cells 308 with intra-board, i.e., unit cell level control (also described further below). Moreover, as described further below, configuration 300 facilitates reliable and efficient control to approximately 1% of an actuator rated torque and is at a minimum, doubly redundant. Alternatively, SCA 200 includes any number of stationary circuit boards 302, 304, and 306 in any configuration that enables operation of SCA 200 as described herein.

In general, configuration 300 leverages a feature of animal muscle fibers termed "variable recruitment". In the human body, for example, one way that muscles perform is that a relatively small number of muscle fibers are activated (used) to pick up a pencil, and in contrast, a much larger number of muscle fibers are used to pick up large rocks. Therefore, in a similar manner as described for muscle fibers, SCA 200 enables and disables portions of machine, i.e., legged robot 100 (shown in FIG. 1) to substantially emulate the variable recruitment within robotic translatables 110 using SCAs 200. Therefore, SCA 200 exhibits a fine control and a high efficiency over a large force and speed range through appropriate regulation of the energization of stationary circuit boards 302, 304, and 306, or portions thereof, as with unit cells 308. In addition, the redundancy of stationary circuit boards 302, 304, and 306, as well as the associated translatable circuit boards (not shown in FIG. 4), an increased fault tolerance is provided over those configurations without redundant circuit boards 302, 304, and 306. For example, and without limitation, if one of stationary circuit boards 302 (or, its associated translatable circuit board) fails, the failed board 302 is removed from service and the remaining board 302 picks up the additional load. As such, the service granularity of configuration 300 extends between just above 0% to approximately 10% using unit cells 308 of boards 306 only, and from approximately 10% up to 100% using at least half of the number of installed boards 302, 304, and 306. For another example, for commonly known loads, each first stationary circuit board 302 may be designed to accommodate such load, thereby reducing the number of boards 302, 304, and 306 installed within SCA 200 as well as reducing a number of switching devices (discussed below) needed for enabling and disabling the boards.

Figure 5:
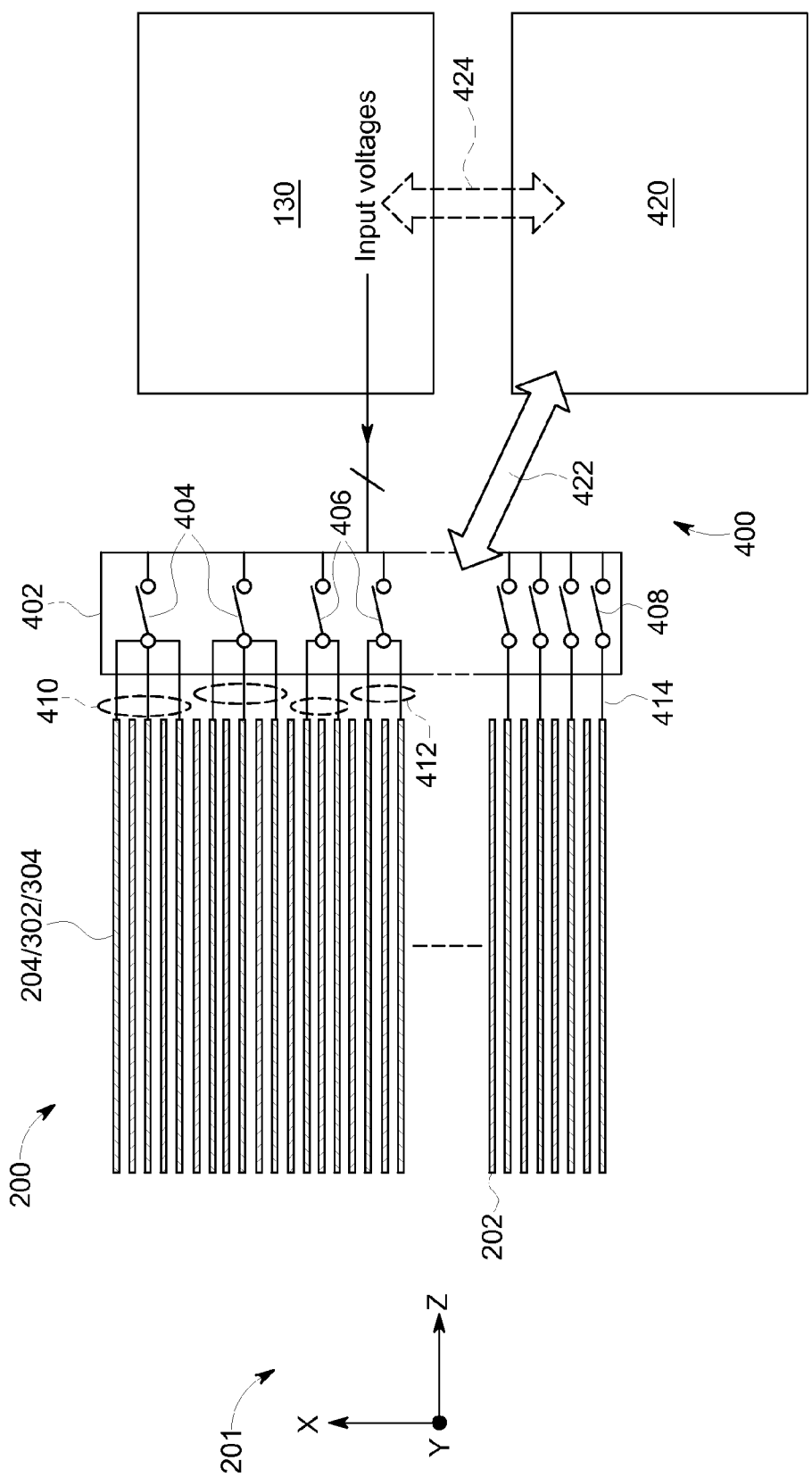
FIG. 5 is a schematic view of an exemplary board level control system using at least a portion of the configuration shown in FIG. 4.

FIG. 5 is a schematic view of an exemplary board level control system 400 using at least a portion of configuration 300 (shown in FIG. 4), i.e., one of stationary circuit boards 302 and 304. Coordinate system 201, including the x-axis (height dimension), the y-axis (longitudinal dimension), and the z-axis (transverse dimension), is provided for reference. SCA 200 includes any number of stationary circuit boards 204/302/304 interdigitated with any number of translatable circuit boards 202 that enables operation of SCA 200 as described herein, including, without limitation, 100 of each board 202 and each board 204/302/304.

Board level control system 400 includes a board selector module 402. Board selector module 402 includes a plurality of switching devices 404, 406, and 408, each described below. Each of switching devices 404, 406, and 408 are any switching devices that enable operation of control system 400 and SCA 200 as described herein, including, without limitation, insulated gate bipolar transistors (IGBTs), metal oxide semiconductor field-effect transistors (MOSFETs), and gate turn-off thyristors (GTOs).

In general, as described above, SCA 200 includes a plurality of first circuit boards, i.e., a numeral N of stationary circuit boards 204/302/304, where N can be any numeral including, without limitation, any numeral within a range between 1 and 100. Also, in general, board level control system 400 includes a plurality of switching devices similar to switching devices 404, 406, and 408 in that the switching devices are coupled to electric power supply system 130 and coupled to a numeral M of stationary circuit boards 204/302/304, where M is any subset of N within a range between 1 and N.

In the exemplary embodiment, switching devices 404 are coupled to electric power supply system 130 and coupled to three stationary circuit boards 204/302/304 through three respective current conductors 410. The diagonal line segment shown in FIG. 5 for the coupling of switching devices 404, 406, and 408 to electric power supply system 130 indicates that a plurality of signals are transmitted therethrough. Similarly, switching devices 406 are coupled to electric power supply system 130 and coupled to two stationary circuit boards 204/302/304 through two respective current conductors 412. Also, similarly, switching devices 408 are coupled to electric power supply system 130 and coupled to a single stationary circuit board 204/302/304 through a single respective current conductor 414.

Alternatively, the switching devices are coupled to any number of stationary circuit boards that enable operation of control system 400 and SCA 200 as described herein, including, without limitation, four, five, and ten stationary circuit boards. The fundamental difference between switching devices 404, 406, and 408 is the current rating of each to simultaneously energize three, two, and single circuit boards 204/302/304, respectively. As such, switching devices 404, 406, and 408 are configured to intermittently energize and de-energize circuit boards 204/302/304 for predetermined periods of time. In the exemplary embodiment, each of circuit boards 204/302/304 are configured to receive a common direct current (DC) input voltage. Alternatively, each of circuit boards 204/302/304 are configured to receive a three-phase alternating current (AC) voltage input.

Board level control system 400 also includes a system level controller 420 coupled in communication with board selector module 402. Controller 420 transmits alternating close and open commands, i.e., gating commands to switching devices 404, 406, and 408 and receives feedback signals from board selector module 402 as shown by double-headed arrow 422. As such, control system 400 enables and disables SCA 200 at a board level through transmitted gating commands 422 as a function of a determined load on SCA 200. In some embodiments, controller 420 transmits voltage commands to electric power supply system 130 as shown by phantom double-headed arrow 424.

Figure 6:
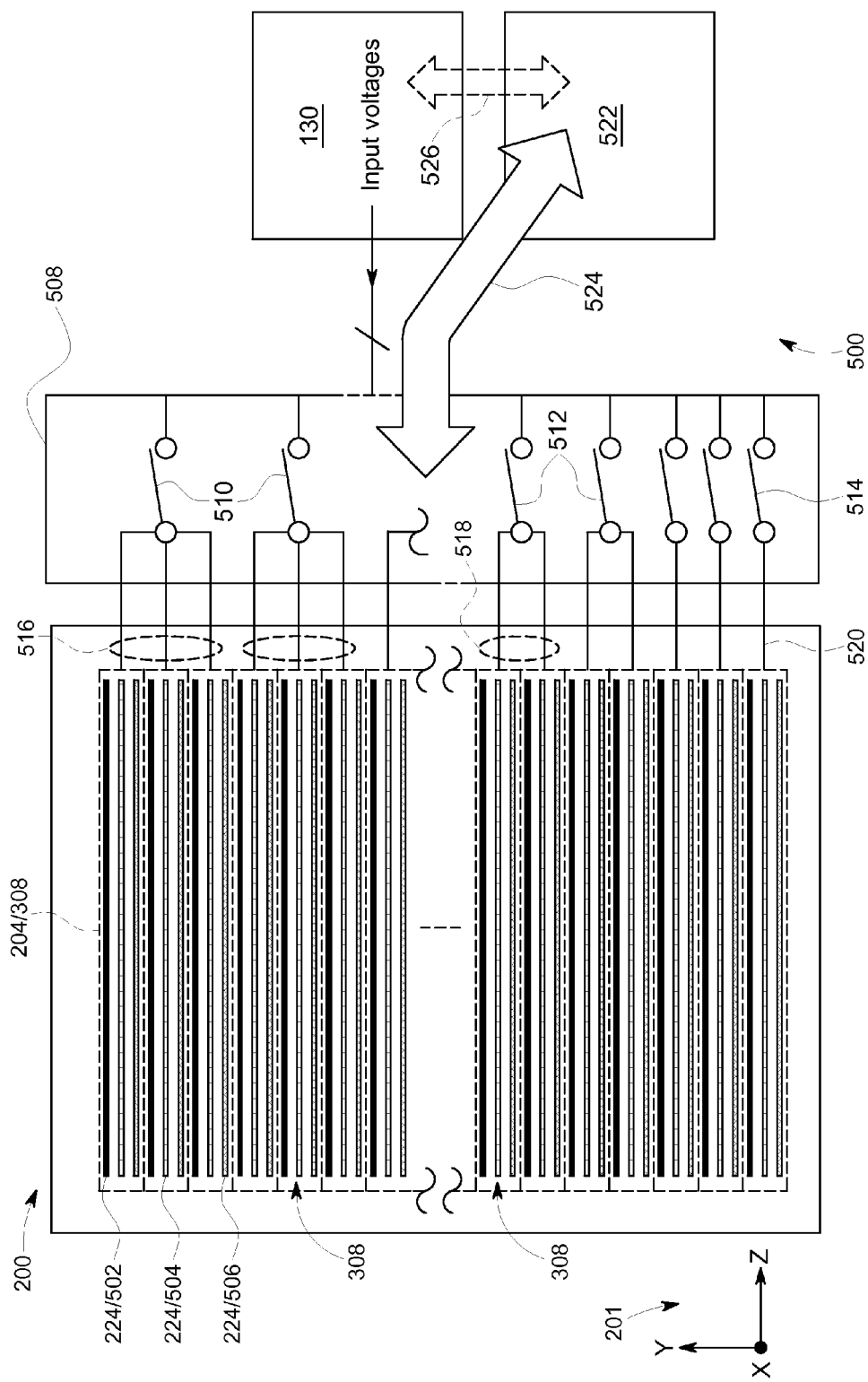
FIG. 6 is a schematic view of an exemplary intra-board level control system using at least a portion of the configuration shown in FIG. 4.

FIG. 6 is a schematic view of an exemplary intra-board level control system 500 using at least a portion of the configuration 300 (shown in FIG. 4), i.e., stationary circuit boards 306. Coordinate system 201, including the x-axis (height dimension), the y-axis (longitudinal dimension), and the z-axis (transverse dimension), is provided for reference. Translatable circuit boards 202 (shown in FIG. 3) are not shown for clarity. SCA 200 includes any number of stationary circuit boards 204/308 interdigitated with any number of translatable circuit boards 202 that enables operation of SCA 200 as described herein, including, without limitation, 100 of each board 202 and board 204/308.

In the exemplary embodiment, stationary circuit board 204/308 includes a plurality of sectionalized unit cells 308 coupled in series together to extend in the y-direction. Each unit cell 308 includes three stationary electrodes 224, i.e., a first stationary electrode 502, a second stationary electrode 504, and a third stationary electrode 506, all extending in the z-direction. Stationary circuit board 204/308 includes any number of sectionalized unit cells 308 that enables operation of SCA 200 as described herein. In the exemplary embodiment, each of electrodes 502, 504, and 506 are configured to receive a common direct current (DC) input voltage. Alternatively, each of electrodes 502, 504, and 506 are configured to receive one of three phases of a three-phase alternating current (AC) voltage input.

Intra-board level control system 500 includes a unit cell selector module 508. Unit cell selector module 508 includes a plurality of switching devices 510, 512, and 514, each described below. Each of switching devices 510, 512, and 514 are any switching devices that enable operation of control system 500 and SCA 200 as described herein, including, without limitation, IGBTs, MOSFETs, and GTOs. Switching devices 510 are coupled to electric power supply system 130 and coupled to three unit cells 308 through three respective current conductors 516. The diagonal line segment shown in FIG. 6 for the coupling of switching devices 510, 512, and 514 to electric power supply system 130 indicates that a plurality of signals are transmitted therethrough. Similarly, switching devices 512 are coupled to electric power supply system 130 and coupled to two unit cells 308 through two respective current conductors 518. Also, similarly, switching devices 514 are coupled to electric power supply system 130 and coupled to a single unit cell 308 through a single respective current conductor 520. The fundamental difference between switching devices 510, 512, and 514 is the current rating of each to simultaneously energize three, two, and unit cells 308, respectively. As such, switching devices 510, 512, and 514 are configured to intermittently energize and de-energize unit cells 308 for predetermined periods of time.

Intra-board level control system 500 also includes a system level controller 522 coupled in communication with unit cell selector module 508. Controller 522 transmits alternating close and open commands, i.e., gating commands to switching devices 510, 512, and 514 and receives feedback signals from unit cell selector module 508 as shown by double-headed arrow 524. As such, control system 500 enables and disables SCA 200 at a unit cell level through transmitted gating commands 524 as a function of a determined load on SCA 200. In some embodiments, controller 522 transmits voltage commands to electric power supply system 130 as shown by phantom double-headed arrow 526.

In the exemplary embodiment, system level controller 420 (shown in FIG. 5) and system level controller 522 are shown as separate controllers. Alternatively, any controller configuration that enables operation of board level control system 400, intra-board level control system 500, and SCA 200 as described herein is used, including, without limitation, a single controller configured to perform all combined operations of controllers 420 and 522, and separate controllers slaved to a single master controller.

Figure 7:
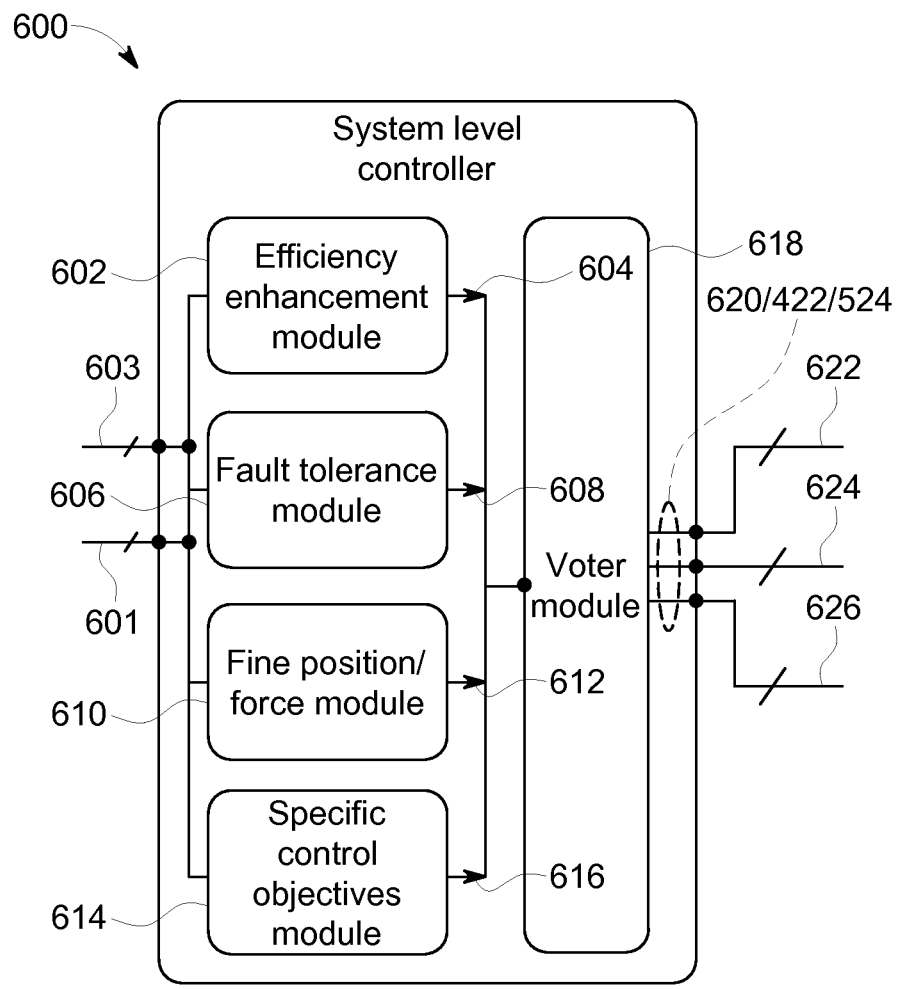
FIG. 7 is a schematic view of an exemplary system level controller that may be used with the SCA shown in FIGS. 1, 2, and 3.

FIG. 7 is a schematic view of an exemplary system level controller 600 that may be used with SCA 200 (shown in FIGS. 1, 2, and 3). System level controller 600 is a single controller configured to perform all combined operations of controllers 420 and 522 (shown in FIGS. 5 and 6, respectively).

In the exemplary embodiment, system level controller 600 includes a first module, i.e., an efficiency enhancement module 602 configured to enhance an energy usage efficiency of SCA 200 through generating a first plurality of commands 604 directed toward a first portion of switching devices 404, 406, 408 (all shown in FIG. 5) and switching devices 510, 512, and 514 (all shown in FIG. 6). Efficiency enhancement module 602 receives force/torque commands 601 from any command source that enables operation of SCA 200 as described herein, including, without limitation, a master controller (not shown). Also, efficiency enhancement module 602 receives other feedback signals 603 from devices that include, without limitation, temperature sensors, strain gauges, and real-time switching device conditions (i.e., open and closed). The diagonal line segments shown in FIG. 7 for force/torque commands 601 and feedback signals 603 indicate that a plurality of signals are transmitted therethrough. Efficiency enhancement module 602 is programmed with sufficient algorithms and instructions to determine enhanced energy efficient switch commands 604, including enhanced energy efficient board level gating commands, intra-board level gating commands, and voltage commands. As such, system level controller 600 enhances efficient usage of electric power from electric power supply system 130 (shown in FIGS. 1, 5, and 6).

Also, in the exemplary embodiment, system level controller 600 includes a second module, i.e., a fault tolerance module 606 configured to enhance a fault tolerance level of SCA 200 through generating a second plurality of commands 608 directed toward a second portion of switching devices 404, 406, 408, 510, 512, and 514. The second portion of switching devices may, or may not, be similar to the first portion of switching devices. Fault tolerance module 606 receives force/torque commands 601 and other feedback signals 603. Fault tolerance module 606 is programmed with sufficient algorithms and instructions to determine enhanced fault tolerance and recovery switch commands 608, including enhanced fault tolerance board level gating commands, intra-board level gating commands, and voltage commands. As such, system level controller 600 enhances work-around solutions for maintaining continuous and consistent operation of SCA 200 in the event of malfunctions of one or more boards 202 and 204 (shown in FIG. 5) or unit cells 308 (shown in FIG. 6).

Further, in the exemplary embodiment, system level controller 600 includes a third module, i.e., a fine position/force module 610 configured to enhance a fine positioning and/or a fine force inducement of SCA 200 through generating a third plurality of commands 612 directed toward a third portion of switching devices 404, 406, 408, 510, 512, and 514. The third portion of switching devices may, or may not, be similar to the first and second portions of switching devices. Fine position/force module 610 receives force/torque commands 601 and other feedback signals 603. Fine position/force module 610 is programmed with sufficient algorithms and instructions to determine enhanced fine positioning and fine force inducement commands 612, including enhanced fine positioning and fine force inducement board level gating commands, intra-board level gating commands, and voltage commands. As such, system level controller 600 enhances fine positioning and fine force inducement for operation of SCA 200 in the event of tight-clearance, delicate, or fragile operations through enhanced incremental positioning of translatable circuit boards 202 in the longitudinal, or y-dimension and to enhance incremental force inducement through incremental changes in the electric field induced by at least a portion of stationary circuit boards 204.

Moreover, in the exemplary embodiment, system level controller 600 includes a fourth module, i.e., a specific control objectives module 614 configured to enhance control of SCA 200 through generating a fourth plurality of commands 616 directed toward a fourth portion of switching devices 404, 406, 408, 510, 512, and 514. The fourth portion of switching devices may, or may not, be similar to the first, second, and third portions of switching devices. Specific control objectives module 614 receives force/torque commands 601 and other feedback signals 603. Specific control objectives module 614 is programmed with sufficient algorithms and instructions to determine specific control objective switch commands 616, including specific control objective board level gating commands, intra-board level gating commands, and voltage commands. As such, system level controller 600 enhances accomplishment of specific control objectives, e.g., and without limitation, position control, velocity control, impedance control [i.e., impedance against applied force induced on an object by robotic appendages 110 (shown in FIG. 1)], ceiling and floor values of articulation of robotic appendages 110, automatic power conservation features at predetermined power reserves, and component temperature parameters.

In addition, in the exemplary embodiment, system level controller 600 includes a fifth module, i.e., a voter module 618 configured to enhance control of SCA 200 through receiving commands 604, 608, 612, and 616, and determining, through prioritization and balancing algorithms and instructions, transmitted commands 620 to switching devices 404, 406, 408, 510, 512, and 514. Such commands are similar to commands 422 and 524 (shown in FIGS. 5 and 6, respectively). Specifically, voter module 618 generates and transmits voltage command signals 622, board level gating signals 624, and intra-board level gating signals 626. The diagonal line segments shown in FIG. 7 for signals 622, 624, and 626 indicate that a plurality of signals are transmitted therethrough. Specifically, signals 622, 624, and 626 include a plurality of switch open commands and switch close commands and sequential voltage commands to selected switching devices 404, 406, 408, 510, 512, and 514, thereby inducing a cyclic substantially linear motion of translatable assembly 206 (shown in FIG. 2) in the longitudinal direction. As such, voter module 618 generates commands that facilitate applying voltages to the variety of electrodes 224 in a specific sequence and in a specific way such that if you, e.g., want more force, more voltage is applied and there is an additional layer of control including turning on and turning off different boards 204. If more voltage is applied, but fewer boards 204 are energized, more force may not be the result and system level controller 600 decides how to control the voltage to the boards and the number of non-sectionalized boards and the portions of the sectionalized boards to enable and disabler to translate robotic appendages 110, e.g., half of an inch.

Referring to FIGS. 4, 5, 6, and 7, and in general, as the number of stationary circuit boards 204 increases, the number of switching devices tends to increase. Therefore, for complicated and robust SCAs 200, there is a potential for a large number of switching devices to increase the size, cost and weight of SCAs 200. FIG. 4 illustrates one method to limit the number of switching devices while maintaining a high degree of controllability, i.e., using a logarithmic configuration with respect to SCA 200. Specifically, in the exemplary embodiment, a plurality of stationary circuit board 204 designs are included within actuator configuration 300 and are logarithmically grouped into different sections. In the exemplary embodiment, ten stationary circuit boards 204 are shown. Assuming each sectionalized board 306 includes ten unit cells 308 such that each board 306 may be energized 10% at a time, thereby requiring ten switches each for a subtotal of 20 switches. Also, since there are four boards 302 that have board level enable and disable features, there is a subtotal of four switches for boards 302. Further, there are four boards 304 where each pair of boards 304 is operated through a single switch, there is another subtotal of two switches, thereby using a total of 26 switches for configuration 300 while maintaining the ability to enable and disable approximately 80% of boards 204 through six switches. The remaining 20 switches facilitate the ability to enable and disable approximately 20% of boards 204/306 through 20 switches, i.e., approximately 1% of boards 204 per switch, thereby facilitating small, incremental movements of leg appendage 110. Alternatively, the granularity of control through individual unit cells 308 is adjusted through more or less boards 306 or more or less unit cells per sectionalized board 306. Also, alternatively, the granularity of control throughout configuration 300 is altered through use of additional switches upstream of the switches closest to the boards to enable and disable a greater number of boards on those occasions requiring such action.

Referring to FIGS. 2, 3, 4, 5, 6, and 7, in operation of SCA 200, a portion of translatable circuit boards 202 to be used to induce a predetermined force for a predetermined period of time for positioning translatable assembly 206 is determined. This determination of load is made, recorded, and stored for known routine operation of SCA 200 and is recorded and stored for previously unanticipated operation of SCA 200. This includes determining at least one of a position and a voltage for positioning translatable assembly 206. This also includes determining a first portion of stationary circuit boards 204 to be energized and a second portion of stationary circuit boards 204 to be de-energized to induce a predetermined electric field to induce the predetermined force to be used for positioning translatable assembly 206. This further includes determining a first portion of unit cells 308 to energize and a second portion of unit cells 308 to de-energize.

Also, in operation, a plurality of gating commands 620/624/626 from controller 600 to switching devices 404, 406, 408, 510, 512, and 514 are transmitted. This includes transmitting a plurality of sequential sets of switch open commands and switch close commands to selected switching devices 404, 406, 408, 510, 512, and 514 determined for each set of sequential switch commands, thereby inducing a cyclic substantially linear motion of translatable assembly 206 in the longitudinal direction. As such, a first portion of switching devices 404, 406, 408, 510, 512, and 514 are opened and a second portion of switching devices 404, 406, 408, 510, 512, and 514 are closed, thereby energizing the first portion of stationary circuit boards 204 and de-energizing the second portion of stationary circuit boards 204 for the predetermined period of time.

Further, in operation, the predetermined electric field about the first portion of the plurality of stationary circuit boards 204 is induced. The electric field is further induced about the determined portion of the plurality of translatable circuit boards 202, and substantially linear motion of translatable assembly 206 in the longitudinal direction as a function of the induced electric field is induced.

Figure 8:
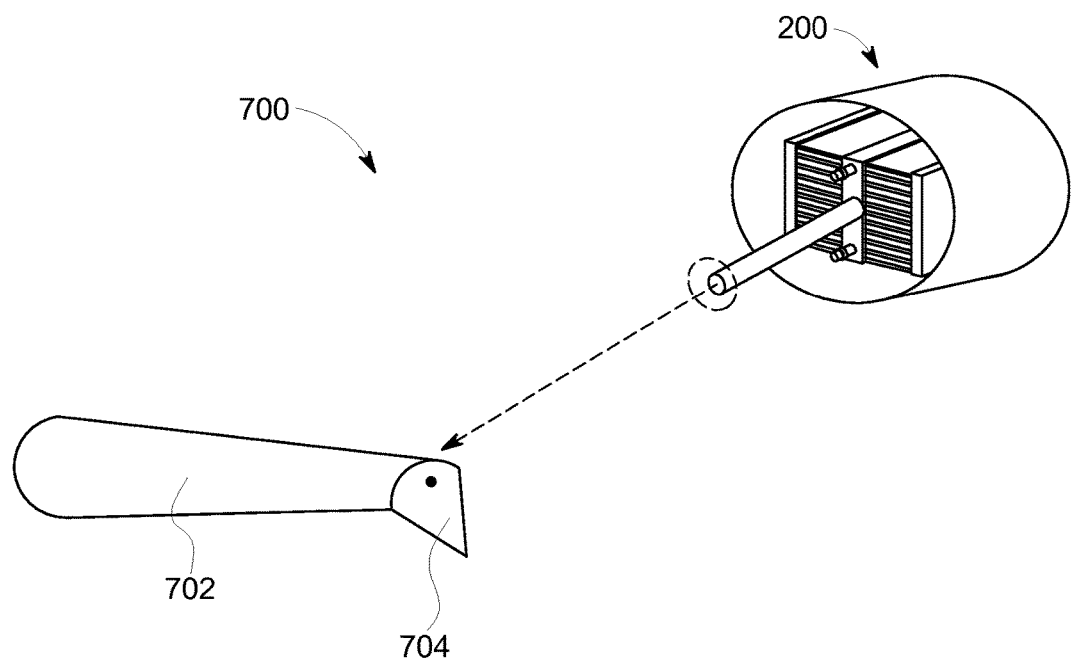
FIG. 8 is a schematic view an aircraft component that may use the SCA shown in FIGS. 1, 2, and 3.

FIG. 8 is a schematic view of another exemplary machine, and more specifically, an aircraft component, i.e., aircraft wing 700 that may use SCA 200. Aircraft wing 700 includes an airfoil portion 702 and a flap portion 704 hingedly coupled to airfoil portion 702 through SCA 200. SCA 200 is energized as described above to hingedly position flap portion 704 through liner translation of SCA 200.

The above-described switched capacitive devices provide a cost-effective method for increasing the energy efficiency of the associated devices and systems. Specifically, in order to achieve higher total energy efficiency for the actuation systems embedded within those systems, a high power switched capacitance actuator (SCA) is used. More specifically, operation of the disclosed SCAs is based on a spatial change of electric fields rather than based on magnetic fields which are used in some conventional EMAs. The SCAs described herein offer advantages over electromagnetic machines that include, without limitation, sufficient torque generation without using continuous current, removing the requirement of using an iron core as a magnetic conductor, eliminating the need for a yoke, and significantly decreasing the amount of copper in the actuators, thereby decreasing the size, weight, and costs of the actuators. Also, specifically, the SCAs described herein are linear, direct drive SCAs without a transmission gear. Therefore, the embodiments described herein further facilitate decreasing the weight of actuation systems used in mobile and/or translatable machines.

In addition, the SCAs described herein provide for an improved efficiency over that of electromagnetic machines because the "stack of plates" structure used with the SCAs as described herein facilitate direct integration of power electronics features. Specifically, power switches directly installed on individual SCA plates facilitate dynamic engagement and disengagement of specific portions of the associate SCA. As such, "variable recruitment" features are used to dynamically regulate the power and torque generated by the associated SCA. As used herein, the term "variable recruitment" is used to define the features associated with selectively opening and closing power switches to selectively de-energize and energize specific circuit boards and specific portions of circuit boards to generate the power and torque necessary to execute specific movements under specific loading conditions. As such, selectively and dynamically disabling and enabling portions of the SCA facilitates increasing the efficiency of operation of the SCA, resulting in lower power consumption and extended life of a present charge on a portable power supply. The ability to enable and disable selected circuit boards at the board level is referred to as "board level" control. Similarly, individual sections of the circuit boards may be selectively enabled or disabled and this ability is referred to as "intra-board level" controls. In addition to increase energy efficiency and reduced power consumption, a fault-tolerance of the SCAs described herein is enhanced. Specifically, in the event of a specific board failure, e.g., a short circuit or an open circuit condition, the power electronics are used to isolate and disable the damaged circuit board. For those SCAs with a large number of circuit boards, e.g., 100 or more, the SCA inherently is configured to tolerate a large range of "degraded" operating conditions.

An exemplary technical effect of the methods, systems, and apparatus described herein includes at least one of: (a) increasing the energy efficiency of switched capacitance actuators (SCAs); (b) increasing the energy efficiency of systems through high power SCAs; (c) using printed circuit boards to generate the translational forces, thereby increasing the ease of fabrication and assembly of SCAs; (d) using variable recruitment features to selectively enable and disable portions of the SCAs as a function of predetermined loading conditions and power/torque requirements; and (e) enhancing a fault-tolerance of the SCAs by isolating and disabling damaged circuit boards.

Exemplary embodiments of switched capacitive devices are described above in detail. The high power SCAs, and methods of operating such systems and devices are not limited to the specific embodiments described herein, but rather, components of systems and/or steps of the methods may be utilized independently and separately from other components and/or steps described herein. For example, the methods may also be used in combination with other systems requiring highly efficient movement of translatable devices, and are not limited to practice with only the systems and methods as described herein. Rather, the exemplary embodiment can be implemented and utilized in connection with many other machinery applications that are currently configured to receive and accept SCAs, e.g., and without limitation, translatable robotic systems in automated assembly facilities.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A switched capacitive device comprising:
   a stationary portion comprising a plurality of first circuit boards extending at least partially in a predetermined dimension;
   a translatable portion comprising a plurality of second circuit boards proximate to, and interdigitated with, said plurality of first circuit boards, said plurality of second circuit boards translatable with respect to said plurality of first circuit boards, said plurality of second circuit boards extending at least partially in the predetermined dimension, said plurality of first circuit boards configured to induce substantially linear motion of said plurality of second circuit boards in the predetermined dimension through the use of an electric field induced by at least a portion of said plurality of first circuit boards; and
   a control system comprising:
      a plurality of switching devices, at least one switching device of said plurality of switching devices coupled to at least a portion of at least one first circuit board of said plurality of first circuit boards, said at least one switching device configured to intermittently energize and de-energize said at least a portion of said at least one first circuit board for predetermined periods of time; and
      a controller coupled to said plurality of switching devices, said controller configured to alternatingly open and close said plurality of switching devices through transmitted gating commands as a function of a determined load on said switched capacitive device.

2. The switched capacitive device in accordance with claim 1, wherein said plurality of first circuit boards comprises N first circuit boards, and wherein said plurality of switching devices comprises at least one switching device coupled to a number of said first circuit boards, the number within a range between 1 and N.

3. The switched capacitive device in accordance with claim 1, wherein:
   said stationary portion comprises a plurality of first electrodes extending at least partially in a transverse dimension orthogonal to the predetermined direction; and
   said translatable portion comprises a plurality of second electrodes proximate said plurality of first electrodes and extending at least partially in the transverse dimension.

4. The switched capacitive device in accordance with claim 3, wherein said switched capacitive device is sectionalized into a plurality of unit cells coupled together, wherein each unit cell of said plurality of unit cells comprises:

a section of said stationary portion comprising a portion of said plurality of first electrodes; and a section of said translatable portion comprising a portion of said plurality of second electrodes, said section of said translatable portion complementary with, and in opposition to, said section of said stationary portion.

5. The switched capacitive device in accordance with claim 4, wherein said at least one switching device is coupled to at least one unit cell of said plurality of unit cells.

6. The switched capacitive device in accordance with claim 5, wherein said at least one switching device is coupled to at least one said stationary portion, said at least one switching device configured to intermittently energize and de-energize said at least one unit cell for a predetermined period of time.

7. The switched capacitive device in accordance with claim 1, wherein said controller comprises at least one of:

a first module configured to enhance an energy usage efficiency of said switched capacitive device through generating a first plurality of switch gating commands directed toward a first portion of said plurality of switching devices;

a second module configured to enhance a fault tolerance of said switched capacitive device through generating a second plurality of switch gating commands directed toward a second portion of said plurality of switching devices;

a third module configured to enhance incremental positioning of said plurality of second circuit boards in the predetermined dimension and to enhance incremental force inducement through incremental changes in the electric field induced by at least a portion of said plurality of first circuit boards through generating a third plurality of switch gating commands directed toward a third portion of said plurality of switching devices; and a fourth module coupled to said first module, said second module, and said third module, said fourth module configured to receive the first plurality of switch gating commands, the second plurality of switch gating commands, and the third plurality of switch gating commands, said fourth module further configured to select switch gating commands transmitted to selected switching devices of at least one of said first, said second, and said third portions of said switching devices.

8. The switched capacitive device in accordance with claim 7, wherein the plurality of switch gating commands includes a plurality of switch open commands and switch close commands, said fourth module further configured to transmit a plurality of sequential voltage commands to said selected switching devices, thereby inducing a cyclic substantially linear motion of said translatable portion in the predetermined direction.

9. A machine comprising:

a body; and at least one mechanism translatably coupled to said body and comprising at least one switched capacitive device configured to induce movement of said at least one mechanism, said at least one switched capacitive device comprising:

a stationary portion comprising a plurality of first circuit boards extending at least partially in a predetermined dimension;

a translatable portion comprising a plurality of second circuit boards proximate to, and interdigitated with, said plurality of first circuit boards, said plurality of second circuit boards translatable with respect to said plurality of first circuit boards, said plurality of second circuit boards extending at least partially in the predetermined dimension, said plurality of first circuit boards configured to induce substantially linear motion of said plurality of second circuit boards in the predetermined dimension through the use of an electric field induced by at least a portion of said plurality of first circuit boards; and a control system comprising:

a plurality of switching devices, at least one switching device of said plurality of switching devices coupled to at least a portion of at least one first circuit board of said plurality of first circuit boards, said at least one switching device configured to intermittently energize and de-energize said at least a portion of said at least one first circuit board for predetermined periods of time; and a controller coupled to said plurality of switching devices, said controller configured to alternatingly open and close said plurality of switching devices through transmitted gating commands as a function of a determined load on said switched capacitive device.

10. The machine in accordance with claim 9, wherein said plurality of first circuit boards comprises N first circuit boards, and wherein said plurality of switching devices comprises at least one switching device coupled to a number of said first circuit boards, the number within a range between 1 and N.

11. The machine in accordance with claim 9, wherein:

said stationary portion comprises a plurality of first electrodes extending at least partially in a transverse dimension orthogonal to the predetermined direction; and said translatable portion comprises a plurality of second electrodes proximate said plurality of first electrodes and extending at least partially in the transverse dimension.

12. The machine in accordance with claim 11, wherein said switched capacitive device is sectionalized into a plurality of unit cells coupled together, wherein each unit cell of said plurality of unit cells comprises:

a section of said stationary portion comprising a portion of said plurality of first electrodes; and a section of said translatable portion comprising a portion of said plurality of second electrodes, said section of said translatable portion complementary with, and in opposition to, said section of said stationary portion.

13. The machine in accordance with claim 12, wherein said at least one switching device is coupled to at least one unit cell of said plurality of unit cells.

14. The machine in accordance with claim 13, wherein said at least one switching device is coupled to at least one said stationary portion, said at least one switching device configured to intermittently energize and de-energize said at least one unit cell for a predetermined period of time.

15. The machine in accordance with claim 9, wherein said controller comprises:

a first module configured to enhance an energy usage efficiency of said switched capacitive device through generating a first plurality of switch gating commands directed toward a first portion of said plurality of switching devices;

a second module configured to enhance a fault tolerance of said switched capacitive device through generating a second plurality of switch gating commands directed toward a second portion of said plurality of switching devices;

a third module configured to enhance incremental positioning of said plurality of second circuit boards in the predetermined dimension and to enhance incremental force inducement through incremental changes in the electric field induced by at least a portion of said plurality of first circuit boards through generating a third plurality of switch gating commands directed toward a third portion of said plurality of switching devices; and a fourth module coupled to said first module, said second module, and said third module, said fourth module configured to receive the first plurality of switch gating commands, the second plurality of switch gating commands, and the third plurality of switch gating commands, said fourth module further configured to select switch gating commands transmitted to selected switching devices of at least one of said first, said second, and said third portions of said switching devices.

16. The machine in accordance with claim 15, wherein the plurality of switch gating commands includes a plurality of switch open commands and switch close commands, said fourth module further configured to transmit a plurality of sequential voltage commands to said selected switching devices, thereby inducing a cyclic substantially linear motion of said translatable portion in the predetermined direction.

17. A method for converting electrical energy into mechanical energy through a switched capacitive device, the switched capacitive device including a stationary portion and a translatable portion, the stationary portion including a plurality of first circuit boards extending at least partially in a predetermined dimension, the translatable portion including a plurality of second circuit boards proximate to, and interdigitated with, the plurality of first circuit boards, the plurality of second circuit boards translatable with respect to the plurality of first circuit boards, the switched capacitive device further including a control system including a plurality of switching devices, at least one switching device of the plurality of switching devices coupled to at least a portion of at least one first circuit board of the plurality of first circuit boards, the at least one switching device configured to intermittently energize and de-energize the at least a portion of the at least one first circuit board for predetermined period of times, the control system including a controller coupled to the plurality of switching devices, the controller configured to alternatingly open and close the plurality of switching devices through transmitted gating commands as a function of loads of the switched capacitive device, said method comprising:

determining a portion of the second circuit boards to be used to induce a predetermined force for a predetermined period of time for positioning the translatable portion;

determining a first portion of the first circuit boards to be energized and a second portion of the first circuit boards to be de-energized;

transmitting a plurality of gating commands from the controller to the plurality of switching devices;

opening a first portion of the plurality of switching devices and closing a second portion of the plurality of switching devices;

inducing the predetermined electric field about the first portion of the plurality of first circuit boards, wherein the electric field is further induced about the portion of the plurality of second circuit boards; and inducing substantially linear motion of the translatable portion.

18. The method in accordance with claim 17, wherein determining a portion of the second circuit boards to be used to induce a predetermined force comprises determining at least one of a position and a voltage for positioning the translatable portion.

19. The method in accordance with claim 17, wherein transmitting a plurality of gating commands from the controller to the plurality of switching devices comprises transmitting a plurality of sequential sets of switch open commands and switch close commands to selected switching devices determined for each set of sequential switch commands, thereby inducing a cyclic substantially linear motion of the translatable portion in the predetermined direction.

20. The method in accordance with claim 17, wherein determining a first portion of the first circuit boards to be energized and a second portion of the first circuit boards to be de-energized comprises inducing a predetermined force for a predetermined period of time for positioning the translatable portion.

21. The method in accordance with claim 17, wherein opening a first portion of the plurality of switching devices and closing a second portion of the plurality of switching devices comprises energizing the first portion of the first circuit boards and de-energizing the second portion of the first circuit boards for the predetermined period of time.

22. The method in accordance with claim 17, wherein inducing the predetermined electric field about the first portion of the plurality of first circuit boards comprises further inducing the electric field about the portion of the plurality of second circuit boards.

23. The method in accordance with claim 17, wherein inducing substantially linear motion of the translatable portion comprises inducing substantially linear motion of the translatable portion in the predetermined direction as a function of the induced electric field.

* * * * *